May 22, 1934.   F. J. RIPPL   1,960,067
METHOD OF AND APPARATUS FOR APPLYING SOLDER
Filed Dec. 19, 1931   2 Sheets-Sheet 1
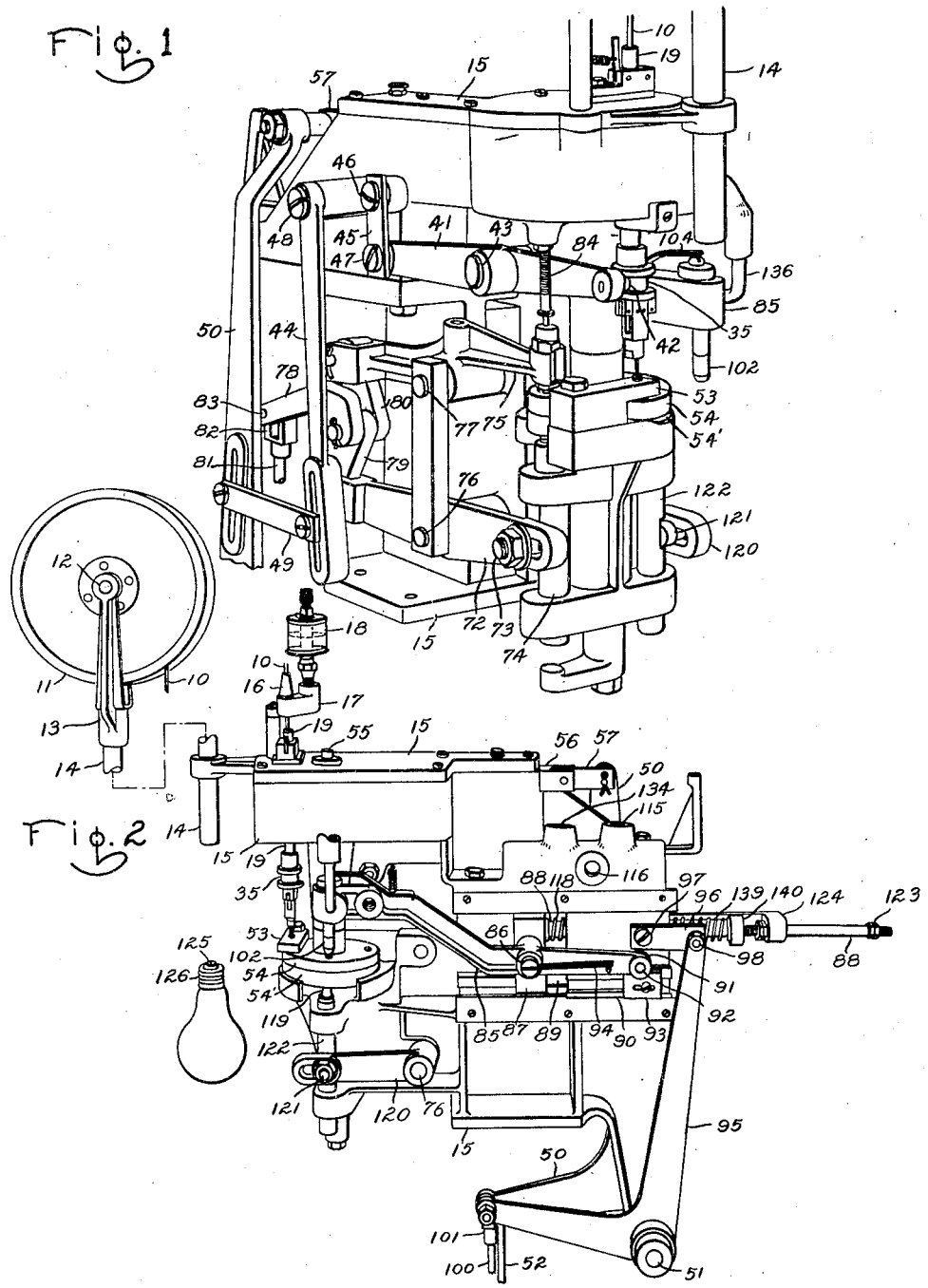

May 22, 1934.　　　　　F. J. RIPPL　　　　　1,960,067
METHOD OF AND APPARATUS FOR APPLYING SOLDER
Filed Dec. 19, 1931　　　2 Sheets-Sheet 2
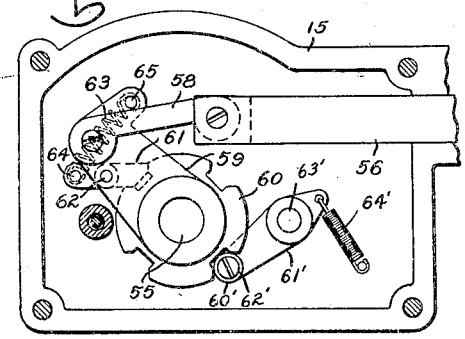
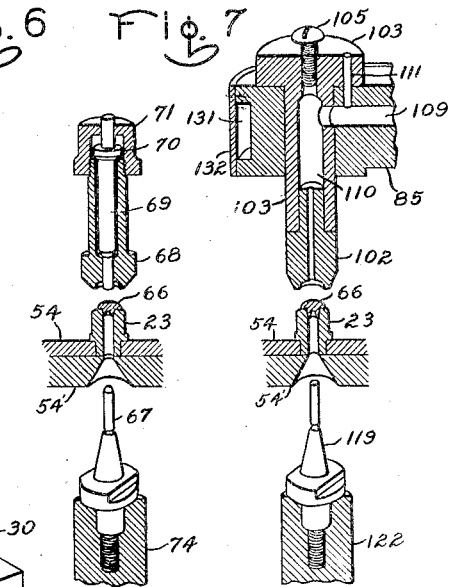
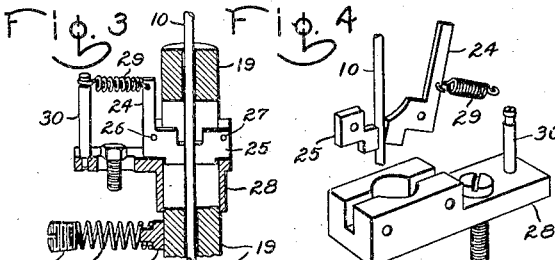
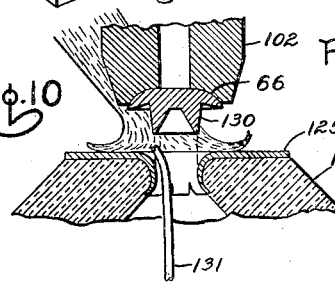
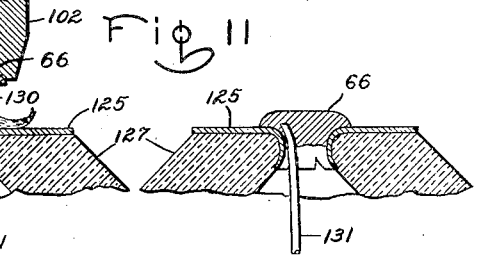
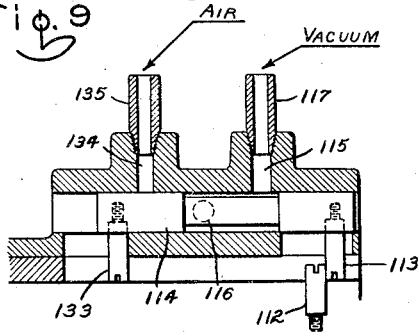
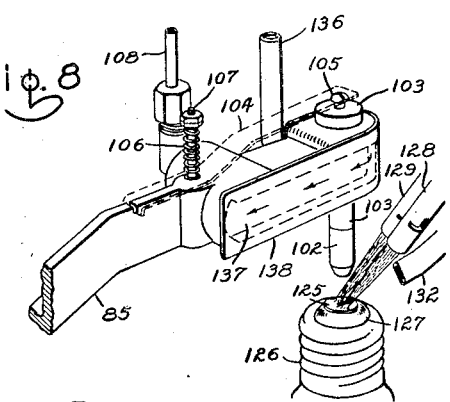
INVENTOR:
FRANCIS J. RIPPL,
Charles E. Mullen
HIS ATTORNEY.

Patented May 22, 1934

1,960,067

UNITED STATES PATENT OFFICE 1,960,067

METHOD OF AND APPARATUS FOR APPLYING SOLDER

Francis J. Rippl, East Cleveland, Ohio, assignor to General Electric Company, a corporation of New York Application December 19, 1931, Serial No. 582,104

13 Claims. (Cl. 113—59)

My invention relates to methods of and apparatus for applying solder and is particularly adapted to the soldering of the end of a conductor in an electrical device to a contact plate or other terminal. Still more particularly my invention relates to the soldering of the end of a lead-wire to the base of an electric lamp or other similar device.

In the case of incandescent electric lamps the base usually comprises an end contact plate having an aperture therein into which the end of a lead-wire extends and solder is applied to unite said end to the contact plate. Heretofore the practice has been to deliver a piece of solder at the said aperture in the contact and to then fuse the solder completely to cause it to enclose the lead-wire end and unite it to the contact. As distinguished from that practice, the method of my invention comprises the delivery to the said aperture of a piece of solder having that portion thereof which is in direct contact with the lead-wire end and contact, and which may be called the inner portion, so shaped that it fuses more readily than the outer portion. This has the advantage that heat may be applied to cause the fusion of the inner portion without fusing the outer portion enough to cause it to lose its shape. Another feature of my invention is the cooling of the outer portion of the piece of solder to still further prevent its deformation. Still another feature is the positive forcing of the piece of solder into the contact aperture upon delivery thereto. The piece of solder as delivered is preferably of rivet shape, the shank portion being of smaller diameter and therefore more easily fused than the head portion. Moreover, the shank portion is preferably made hollow and also, preferably, the wall tapers to a thin outer edge so as to make it still more easily fusible.

Advantages of my invention are the very secure union of the lead-wire to the contact and the uniformity in thickness and also shape of the piece of solder after the completion of the operation. Other features and advantages of my invention will appear from the following description of a species thereof and from the accompanying drawings.

This application is a continuation in part of my application Serial No. 505,136 filed December 27, 1930.

In the drawings, Figs. 1 and 2 are perspective views of my device for soldering the leading-in wire to the end contact or eyelet of the base; Fig. 3 is a vertical section through the solder wire feeding mechanism and a portion of the rivet forming turret; Fig. 4 is a disassembled perspective view of the clutch which prevents the solder wire backing up in the feed mechanism; Fig. 5 is a plan view of the indexing mechanism of the rivet forming turret; Fig. 6 is a vertical section through the rivet forming mechanism; Fig. 7 is a vertical section through the rivet transferring head in position over the rivet; Fig. 8 is a perspective view thereof in position over a lamp; Fig. 9 is a vertical section through the suction controlling valve thereof; Fig. 10 is a vertical on an enlarged scale of both the solder rivet and the base eyelet before said parts are assembled and united; and Fig. 11 is a vertical section through said eyelet after the parts have been united.

Referring now to the drawings, and more particularly to Figs. 1 and 2, the apparatus shown is adapted to be substituted for the corresponding parts in the basing and soldering machine disclosed in Patent 1,708,756 to Fagan et al., issued April 9, 1929. This particular machine comprises means for carrying the lamps to and presenting each in turn to the apparatus shown. The end of the leading-in wire protruding from the hole in the eyelet has been trimmed so that it extends only slightly above the eyelet and both the end of the wire and the eyelet have been coated with the soldering flux. The base is almost at the temperature required to melt the solder as it has just passed from between the fires which bake the basing cement.

The solder rivet is formed from a length of solder cut from solder wire 10 which unwinds from spool 11. Said spool is supported on pin 12 in yoke 13 which is supported by rod 14 extending from standard 15 of the device. The wire 10 passes from the spool down through guide 16 and arm 17, the latter of which oils said wire by means of a felt wet with oil from cup 18. From there, as shown in Fig. 3, said wire passes through aligned axial passages in rod 19, block 20, nozzle 21, cutting die 22 and shaping die 23. In the rod 19 said wire is engaged by fingers 24 and 25 which prevent it from moving upwardly as they are mounted on pins 26 and 27 respectively in block 28 which is bolted to standard 15. The fingers are kept in engagement with the wire by spring 29 which extends between spring post 30 and finger 24. The wire is fed downwardly by grippers 31 and 32 which operate about pins 33 and 34 respectively and in oppositely disposed slots in block 20. The grippers are caused to engage said wire by the downward movement of collar 35 which operates said grippers through pins 36 and 37 respectively. With engagement of the grippers the block 20 and parts attached thereto will be moved down until the required amount of wire has been fed through cutting die 22 and into shaping die 23. Before the grippers have engaged, the rod 19 is supported by friction block 38 which is backed by spring 39 and screw 40. Operating mechanism for the collar 35 comprises lever 41 which engages by pin 42 the flanges of said collar and which is operated about pin 43 in the standard by lever 44 to which it is connected by link 45 and pins 46 and 47. Lever 44 is swung about pin 48 by link 49 which connects it to lever 50 and which is adjustably attached to each lever, providing facilities for regulating the amount of wire fed. Lever 50 (Fig. 2) is operated about pin 51 in the standard by operating rod 52.

Cutting die 22 is supported in direct alignment with forming die 23 by block 53 which is stationarily mounted on the standard. With the rotation of wheel 54 in which the forming die is located, that portion of said wire advanced thereinto by the feeding movement is separated from the rest. This leaves a pellet of solder in said die which is kept from dropping out by plate 54'. Wheel 54 carries four such dies equally spaced in its periphery and takes intermittent motion from shaft 55 which runs up through the upper portion of the standard. This shaft 55 connects to the mechanism shown in Fig. 5 which causes the wheel to be indexed in 90° movements. The indexing occurs as lever 50 (Figs. 1 and 2) is drawn back following the forward motion of the lever which causes the wire to be fed and causes bar 56 to which it is connected by link 57 to be moved. As shown in Fig. 5, this bar is connected by link 58 to arm 59 which engages ratchet wheel 60 on shaft 55 through pawl 61. The pawl operates about pin 62 and is held against the ratchet wheel by spring 63 which is stretched between spring post 64 in said pawl and spring post 65 in arm 59. Ratchet wheel 60 is kept from being turned counter-clockwise with the return of pawl 61 by roller 60'. Lever 61' on which the roller 60' is mounted by pin 62' causes the roller to engage the wheel by being turned about pin 63' by spring 64'.

The next indexing of the wheel 54 brings another forming die into the feeding position and carries the former die into alignment with mechanism that forms the solder pellet into a rivet. The rivet 66 is formed, as shown in Fig. 6, by the plunger 67 which by moving upwardly drives the pellet into the end of die 68. The action raises plunger 69 until the shoulder 70 is against cap screw 71. Plunger 67 is operated through lever 72 which engages by means of a pin 73 a slot in rod 74 to which said plunger is attached. Die 68 is operated through lever 75 which, unlike lever 72 which operates shaft 76 in the standard 15, is operated about a pin 77 in the standard by the movements of lever 78. The toggle action of this lever with respect to levers 72 and 75 to which it is connected by links 79 and 80 respectively is produced as said lever is turned about a pin (not shown) in the standard by operating rod 81. Said rod is connected to the lever by yoke 82 and a block (not shown) on pin 83. With the return of this mechanism, the rivet 66 will be driven from the die 68 by the end of plunger 69 striking the end of stationary pin 84. The particular shape of the rivet contributes greatly to the success of this method of solder and is more clearly shown in Fig. 10.

The wheel 54 is indexed two 90° movements before the solder carried therein is again operated upon. At this position, 270° clockwise from the position the solder entered the die, the rivet is picked up by the suction head shown in Figs. 7 and 8 and transferred to the base. The suction head is located in an end of lever 85 which is mounted on pin 86 in block 87. The block is supported by its base which rides on a horizontal portion of standard 15 and by rods 88 and 89 which are slidably mounted in slide 90. The head is first lowered on to the rivet by roller 91 on pin 92 passing over the raised portion of cam 93 thus overcoming the effect of leaf spring 94 in pin 86 which tends to hold the head in the raised position. Movement of slide 90 on which cam 93 is attached is produced by lever 95 to which said slide is attached by link 96 and pins 97 and 98, and takes place as said lever is moved about pin 51 by operating rod 100 to which the lever is attached by yoke 101. The tip 102 of spindle 103 comes in contact with the rivet and as the head continues to move, the spindle moves vertically therein against the action of lever 104. Said lever engages the spindle through screw 105 and acts through expansion of spring 106 on pin 107 in the head. With the spindle in contact with the rivet, vacuum is applied to the head through pipe connection 108 which connects to passage 109 which in turn connects to passage 110 in both the spindle 103 and tip 102. Pin 111 keeps these passages aligned. The same rightward motion of slide 90 which lowered the head causes the valve shown in Figs. 2 and 9 to apply the vacuum. This is done by pin 112 in the slide striking pin 113 thereby moving valve 114 into such position that the vacuum will have free passage from passage 115 to passage 116. Passage 116 is connected by a hose (not shown) to pipe 108 in the suction head and passage 115 leads to pipe 117 which is connected by a hose to any source of vacuum.

Having gripped the rivet, the suction head is caused to move upward, outward and downward on to the base. The upward movement occurs as roller 91 is moved on to the lower part of cam 93 by the leftward motion of slide 90 and the outward movement occurs as block 87 is moved leftward by slide 90 to which it is connected by spring 118. Said spring is largely confined in an opening in the slide. With the raising of the suction head, a like movement appears in plunger 119 (Figs. 2 and 7) which forces the rivet out of the forming die. This action results from the movement of lever 120 which is turned by shaft 76 and engages by pin 121 a slot in rod 122 to which said plunger is attached. Shaft 76 is turned by lever 72 previously described to which it is fastened. The outward movement of the suction head ends when nut 123 strikes arm 124 of the standard as said head should then be above the base. The head is then lowered on to the base by a thicker portion of cam 93 coming under roller 91 in lever 85.

During the downward movement of the suction head the rivet 66 (Figs. 8 and 10) is carried into engagement with the eyelet 125 of the base which is made of electrically conductive material, such as brass, and which is insulated electrically from the electrically conductive shell 126 by glass 127. The eyelet is heated both by burners 128 and 129 and has also been heated previously during the basing operation of the parent machine (not shown). The shank 130 of the rivet is preferably slightly larger in diameter than the hole in the eyelet and is melted almost immediately on engagement therewith. The shape of the shank shown is preferred as it is hollow and tapers so as to present a thin edge to the eyelet which quickly fuses. The transferring head continues to exert a slight pressure on the rivet and the shank becomes gradually fused. The melted solder of the shank attaches itself to both the leading-in wire 131 and the eyelet. The outer portion or head of the rivet is kept cool by the tip 102 and does not change shape during the period the tip is in contact therewith. Its more compact shape also prevents its fusion. As the suction head is raised for removal the rivet is released therefrom by air passing through the head instead of vacuum. Just before the head is raised the fires from burners 128 and 129 are deflected to either side of the tip by air which blows from pipe 132 (Fig. 8). This air cools both the suction head and the rivet head, the latter after the head has moved. Air is applied to the suction head instead of vacuum by pin 112 (Fig. 9) in slide 90 moving piston 114 to the left through engagement with pin 133. Vacuum passage 115 is then covered by the piston and air passage 134 is opened to passage 116. Air is supplied to passage 134 by pipe 135 from some convenient source. The suction head is cooled further by air from pipe 136 circulating through passage 137 behind plate 138. The head is returned to its original position by movement of slide 90 to the right which engages block 87 on which said head is mounted through spring 139 and collar 140.

What I claim as new and desire to secure by Letters Patent of the United States is:

1. The method of applying solder which comprises the delivery to the point of soldering of a piece of solder having its inner or contacting portion hollowed out so as to be more readily fusible than its outer portion and applying heat thereto under such conditions as to cause the fusion of said inner portion without destroying the shape of the said outer portion.

2. The method of applying solder which comprises the delivery to the point of soldering of a piece of solder having its inner or contacting portion hollowed out with a tapered wall so as to be more readily fusible than its outer portion thereof and applying heat thereto under such conditions as to cause the fusion of said contacting portion without destroying the shape of the said outer portion.

3. The method of applying solder to unite to a contact the end of a lead-wire extending through an aperture in said contact which comprises pressing against said aperture a piece of solder and applying heat to fuse a portion thereof adjacent said aperture while maintaining the outer portion of said piece of solder so cool as to prevent its fusion.

4. The method of applying solder to unite to a contact the end of a lead-wire extending through an aperture in said contact which comprises pressing against said aperture the end of the shank of a solder rivet and applying heat to cause the fusion of said shank without fusing the head of said rivet sufficiently to cause it to change its form.

5. The method of applying solder to unite to a contact the end of a lead-wire extending through an aperture in said contact which comprises pressing against said aperture the end of the hollow shank of a solder rivet and applying heat to cause the fusion of said shank without fusing the head of said rivet sufficiently to cause it to change its form.

6. The method of applying solder to unite to a contact the end of a lead-wire extending through an aperture in said contact which comprises pressing against said aperture the end of the tapered hollow shank of a solder rivet and applying heat to cause the fusion of said shank without fusing the head of said rivet sufficiently to cause it to change its form.

7. The method of applying solder to unite to a contact the end of a lead-wire extending through an aperture in said contact which comprises pressing against said aperture the end of the shank of a solder rivet and applying heat to cause the fusion of said shank while maintaining the head of said rivet cool.

8. A soldering apparatus comprising a die for forming a piece of solder into a rivet, a transfer head for engaging the head of said rivet, means for moving said head to transfer it into position over an article to be soldered, means for then moving said head to press said rivet against said article and means for subsequently removing said head.

9. An apparatus for soldering lead wires to bases of incandescent lamps and similar devices comprising a means for successively presenting pieces of solder, mechanism for transferring said pieces in succession to a base and definitely locating each of them at the junction of the end of a lead wire and said base so that it may not move comprising vacuum means for successively engaging said pieces of solder, and means whereby said parts are caused to operate in proper sequence and in definite time relation to each other.

10. A soldering apparatus comprising a movable member having a series of apertures therein, means for feeding pieces of solder to said apertures, means comprising a die and plunger for forming each of said pieces into a rivet, means for transferring each of said rivets in succession to the article being soldered and means whereby the movement of said parts is caused to be intermittent and in proper time relation.

11. A soldering apparatus comprising a movable member having a series of apertures therein, means for rotating said member, means for feeding pieces of solder to said apertures, means comprising a die and plunger for forming each of said pieces into a rivet, means for transferring each of said rivets in succession to the article being soldered and means whereby the movement of said parts is caused to be intermittent and in proper time relation.

12. A soldering apparatus comprising a movable member having a series of apertures therein, means for rotating said member, means for feeding pieces of solder to said apertures, means comprising a die and plunger for forming each of said pieces into a rivet, means for transferring each of said rivets in succession to the article being soldered and carrying vacuum means for engaging said pieces, and means whereby the movement of said parts is caused to be intermittent and in proper time relation.

13. In a soldering apparatus the combination of a turret having a series of apertures therein, means for feeding a solder wire to one of said apertures, means for indexing said turret to cut off a length of solder wire from said wire and to present another aperture to the feeding mechanism, means for forming said wire length into a rivet comprising a die engaging a portion of said length, means for removing each of the rivets thus formed from the turret in succession and transferring it to the article to be soldered, and means whereby the movement of the aforesaid parts is caused to occur in proper time relation.

FRANCIS J. RIPPL.